United States Patent [19]
Ikeda et al.

[11] Patent Number: 5,456,158
[45] Date of Patent: Oct. 10, 1995

[54] RECIPROCATING COMPRESSOR

[75] Inventors: Hayato Ikeda; Tomoji Tarutani; Masaaki Nishimoto, all of Kariya, Japan

[73] Assignee: Kabushiki Kaisha Toyoda Jidoshokki Seisakusho, Kariya, Japan

[21] Appl. No.: 346,698

[22] Filed: Nov. 30, 1994

[30] Foreign Application Priority Data

Dec. 6, 1993 [JP] Japan .................................. 5-305344

[51] Int. Cl.⁶ ..................................................... F01B 3/00
[52] U.S. Cl. ........................ 92/71; 92/128; 74/60; 417/269; 411/176
[58] Field of Search ........................... 92/12.2, 71, 128, 92/57; 91/499; 411/8, 81, 166, 168, 171, 176, 180, 181, 183, 184; 74/60; 417/269

[56] References Cited

U.S. PATENT DOCUMENTS 3,193,921  7/1965  Kahn ......................................... 411/183

FOREIGN PATENT DOCUMENTS

| 0400108 | 10/1933 | United Kingdom | 411/168 |
| 0745876 | 3/1956 | United Kingdom | 411/171 |
| 0786177 | 11/1957 | United Kingdom | 411/171 |

*Primary Examiner*—Thomas E. Denion
*Attorney, Agent, or Firm*—Brooks Haidt Haffner & Delahunty

[57] ABSTRACT

A refrigerant compressor of the type in which a cylinder block and front and rear housings made of an aluminum alloy are fastened together by means of a plurality of bolts made of a ferrous metal and extending through part of the refrigerant gas passage in the compressor and respective bores formed in the front housing, is disclosed. Each of the bolts has a head supported on a bearing surface formed on said housing means, the bearing surface being formed by an annular projection concentric with the bore in the housing. The annular projection is plastically deformed by the bolt when the compressor is assembled, and the bolt head is carried by such deformed annular projection so that an increase in the tightening force is taken up by the elasticity of the projection.

7 Claims, 3 Drawing Sheets

RECIPROCATING COMPRESSOR

BACKGROUND OF THE INVENTION

The present invention relates to a reciprocating piston type refrigerant compressor adapted for use in an automotive air conditioning system.

For compressing refrigerant gas for an automotive air conditioning system, various kinds of piston compressors are available, including double-headed and single-headed piston types in respect of the piston configuration, and constant and variable capacity types in terms of the piston drive mechanism. Generally, these different compressors have a cylinder block in which a plurality of cylinder bores are formed for receiving therein reciprocally slidable pistons, and a pair of housings which are disposed so as to close the opposite axial ends of the cylinder block, and these housings and the cylinder block are fastened together by means of a plurality of common through bolts extending through these parts.

In a typical swash-plate type compressor equipped with double-headed pistons as shown in FIG. 3 in longitudinal cross section, the opposite ends of cylinder block means of the compressor formed by a pair of cylinder block members 1a, 1b are closed by front and rear housings 2, 3 and these four members 1a, 1b, 2, 3 are fastened together by means of a plurality of through bolts 10 (only one bolt being shown in FIG. 3). Referring now to FIG. 4 showing a typical wobble-plate, variable-displacement type compressor with single-headed pistons, its cylinder block 1 and the front and rear housings 2, 3 closing the opposite axial ends of the cylinder block 1 are also tightened together similarly by means of a plurality of bolts 10, while the through bolts 10 are usually made of a ferrous metal.

In view of the application of the compressors to an automotive air conditioning system, at least the pair of housings 2, 3 are usually made of an aluminum alloy for the sake of lightweightness of the compressors.

In a compressor constructed such that the bolts 10 pass through part of the gas passage in the compressor, e.g. swash plate chamber 4a and suction passage 4b in FIG. 3 or a crankcase chamber 4 in FIG. 4, a bore 6 formed in the front housing 2 for receiving therein one shank end portion of the bolt 10 adjacent its head forms with the bolt shank an annular clearance which is in direct communication with the gas passage in the compressor. For this reason, provision must be made to seal the opening of the bolt receiving bore 6 adjacent the bolt head while the tightening force of the bolt is retained. For this purpose, a washer 5 which is made of, e.g., a copper alloy is disposed between the head of the bolt 10 and a bearing surface formed on the front housing 2 so that the bolt head is supported by the bearing surface by way of the washer 5. It is to be noted, however, that the tightening force of the bolt 10 is built up with an increase in the temperature of the compressor in its continued operation because the housings 2, 3 made of aluminum alloy expand greater extent than the bolts 10 made of ferrous metal having a smaller linear expansion coefficient than the aluminum alloy. Such increased tightening force of the bolt acting on the housing may cause its bearing surface to be buckled or collapsed particularly at the inner edge region thereof adjacent the opening of the bolt receiving bore 6, as indicated by Z in FIG. 2. Such damage to the bearing surface reduces the tightening force of the bolt, thereby causing development of noise and vibration and also affecting gas sealing at the washer 5.

An object of the present invention, which is made in light of the above-described drawback, is to provide a refrigerant compressor which can prevent the tightening forces of the bolts from being reduced and also ensure fluid-tight sealing.

SUMMARY OF THE INVENTION

The above objects of the invention can be accomplished by providing a refrigerant compressor comprising a cylinder block, housing means made of an aluminum alloy, and a plurality of through bolts extending through part of the refrigerant gas passage in the compressor and a bore formed in the housing means for fastening together the cylinder block and the housing means, wherein each of said bolts has a head supported on a bearing surface formed on said housing means, the bearing surface being formed (b) an annular projection concentric with the bore in the housing means. The annular projection, as formed on the bearing surface before the compressor is assembled, preferably has a rectangular shape as seen in cross section through the axial center of the bore, having width of about 0.5 mm as measured radially with respect to the bore and axial height of at least 0.05 mm as measured from the bearing surface of the housing means.

When the compressor is assembled with the cylinder block and the housing means clamped together by means of the bolts, the annular projection on the bearing surface is plastically deformed only to such an extent that a small clearance is provided between the bearing surface and the bolt head. In operation of the compressor, the tightening force of the bolt tends to be built up gradually with an increase in the temperature of the compressor because of the housing means being made of aluminum alloy having a greater linear expansion coefficient than the bolt made of ferrous metal. However, the elasticity of the deformed and hence hardened annular projection on the bearing surface can serve to take up the increase in the tightening force of the bolt.

Therefore, the above-described damage to the inner edge region of the bearing surface adjacent the opening of the bore can be prevented successfully, so that a reduction in the tightening force, resulting from damage to the bearing surface causing development of vibration and noise and also affecting gas sealing at the bolt head, can be forestalled.

The above and other advantages and features of the invention will become apparent from the following detailed description taken in conjunction with the accompanying drawings.

DETAILED DESCRIPTION OF PREFERRED EMBODIMENT

Figure 3:
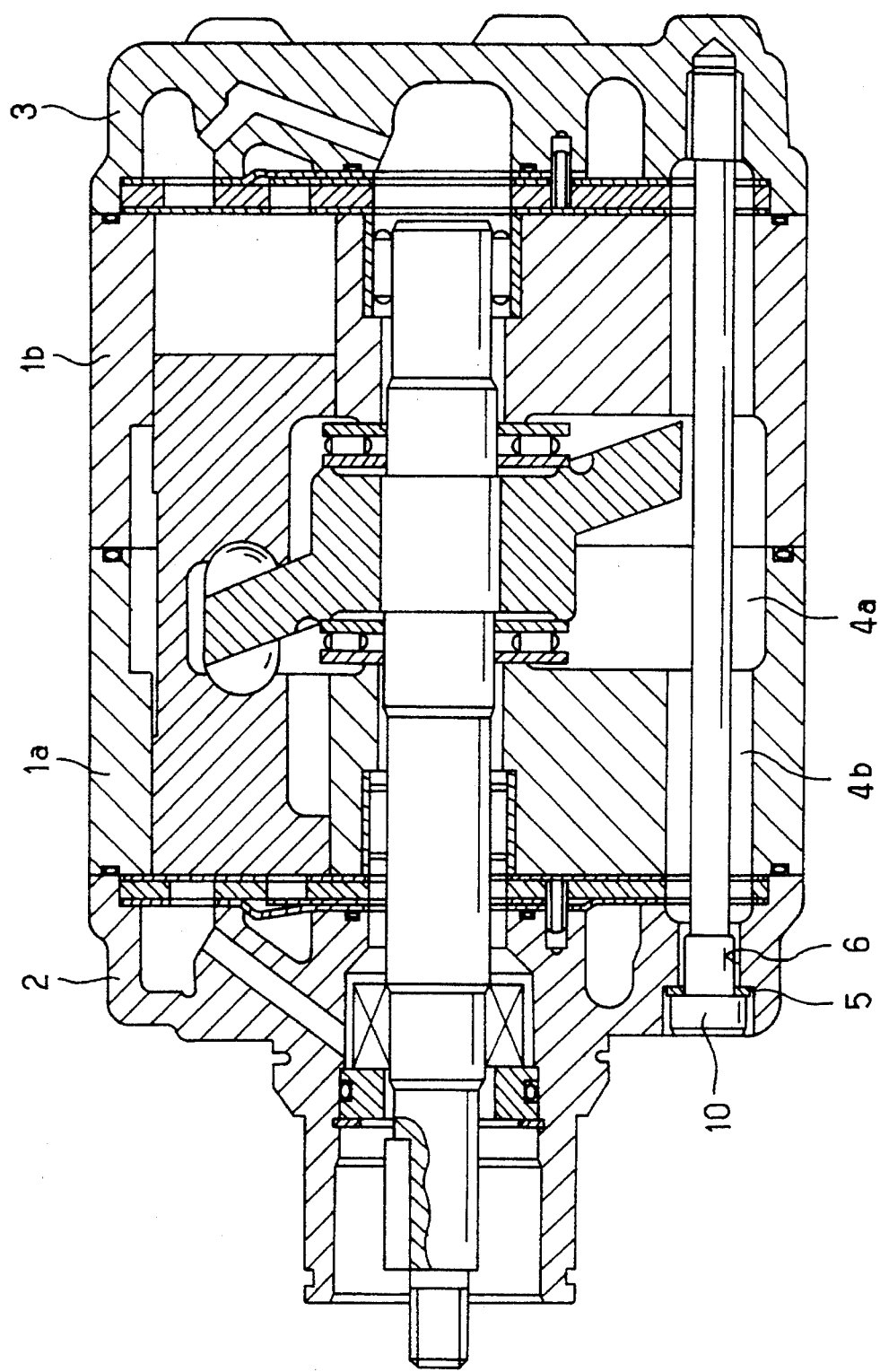
FIG. 3 is a longitudinal cross-sectional view of a conventional swash-plate type compressor with double-head pistons.
Figure 4:
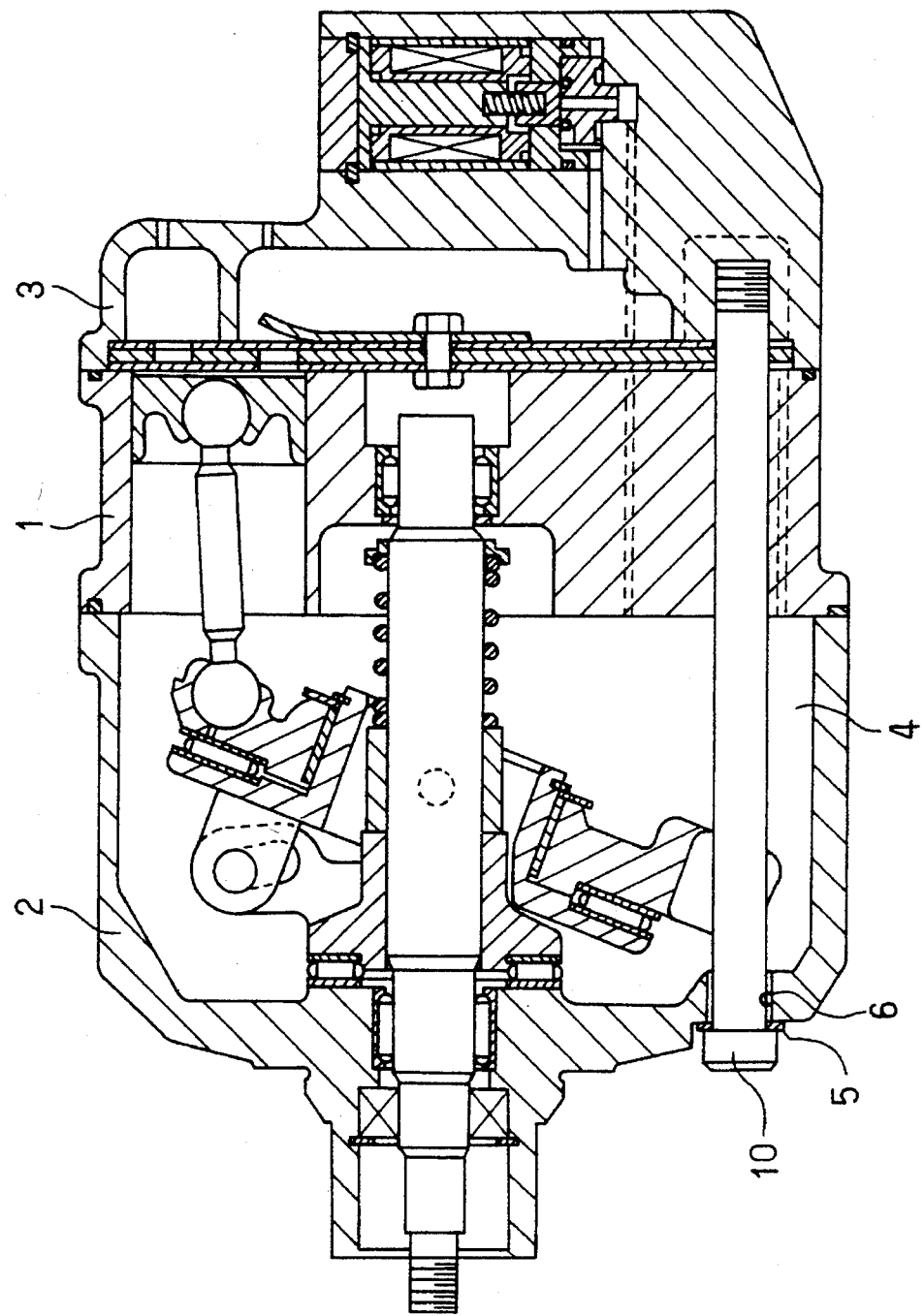
FIG. 4 a longitudinal cross-sectional view of a conventional wobble-plate type compressor with single-head pistons.

A preferred embodiment of a compressor according to the present invention will be described in the following with reference to FIG. 1. Since the major parts of the compressor are substantially the same as those in the conventional compressors shown in FIGS. 3 and 4, detailed description and illustration thereof will be omitted in the following explanation of the preferred embodiment of the invention. It is also to be noted that the invention is applicable to either of the arrangements of the bolts 10 wherein the bolt head is received in a recess formed in the housing 2 as shown in FIG. 3 and wherein the head is exposed outside the housing as shown in FIG. 4.

Figure 1:
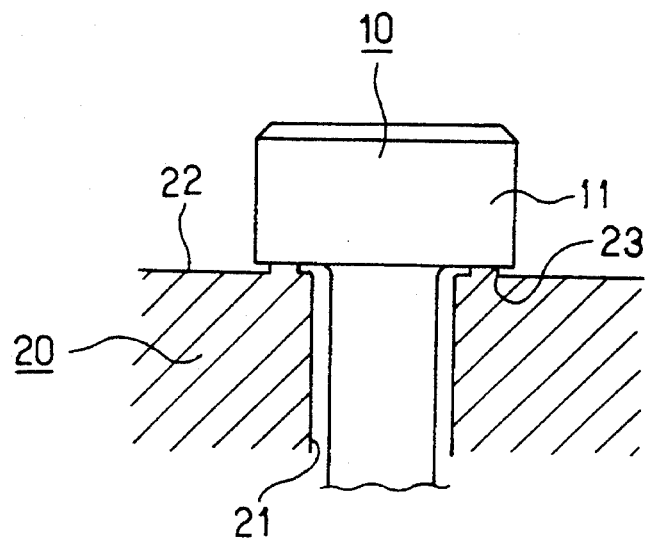
FIG. 1 is a fragmented cross sectional view showing part of a refrigerant compressor according to the present invention where the head of a through bolt is supported by a bearing surface on the front housing of the compressor.
Figure 2:
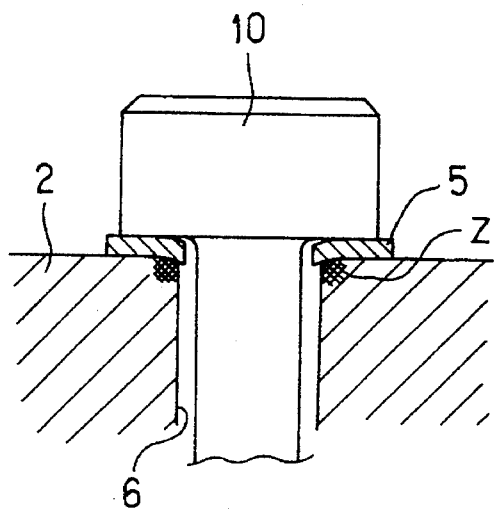
FIG. 2 is a view similar to FIG. 1, but showing a conventional compressor, wherein the bolt head is supported by the bearing surface of the compressor housing via a washer.

Reference numeral 20 in FIG. 1 designates part of a front housing made of an aluminum alloy and disposed so as to close one end of a cylinder block (not shown). The front housing 20 is formed with a plurality of bores 21, only one being shown, through which one shank end portion of each of a plurality of through bolts 10 adjacent the head 11 thereof extends with an annular clearance formed surrounding the bolt shank end portion and in direct communication with a refrigerant gas passage (under suction pressure in FIG. 3 or crankcase pressure in FIG. 4) in the compressor. The front housing 20 has a bearing surface 22 which is formed with an annular projection 23 concentric with, and preferably space radially away from the bolt receiving bore 21 and, therefore, the bolt 10 is supported at its head 11 by this annular projection 23 in contact therewith. In the state where the compressor is yet to be assembled with the cylinder block and the housings being separate, the annular projection 23, as seen in FIG. 1 in cross section through the axial center of the bolt receiving bore 21, has a rectangular shape with a width of about 0.5 mm as measured radially with respect to the bore 21 and an axial height of at least 0.05 mm as measured from the bearing surface 22 of the front housing 20.

When the compressor is assembled with the cylinder block and the opposite housings combined and clamped together by means of the through bolts 10, the annular projection 23 on the bearing surface 22 of the front housing 2 is plastically deformed, or reduced in its height, but only to such an extent that a small clearance is provided between the bearing surface 22 and the bolt head 11 so that the inner edge region of the bearing surface 22 adjacent the opening of the bolt receiving bore 21 does not directly receive the tightening force of the bolts 10. When the compressor is thus assembled, the annular projection 23 is hardened by work hardening taking place as a result of the plastic deformation of the projection.

As the compressor temperature is increased gradually in continued operation of the compressor, the front housing 20 made of aluminum alloy expands to a greater extent than the bolts 10 which are made of ferrous metal and the tightening force of the bolts tends to be increased, accordingly. However, such increase in the tightening forces of the bolts 10 can be taken up by elastic deformation of the hardened annular projections 23. As a result, the otherwise harmful influence of increased tightening force of each bolt 10 on the bearing surface 22 which may cause damage at the inner edge region of the bearing surface 22 adjacent the opening of the bore 21 can be prevented successfully. Additionally, variation in the tightening forces of the bolts 10 due to a change in the compressor temperature can be limited to a negligible extent in practical use of the compressor. Such limited variation in the tightening forces of the bolts 10, together with the freedom of the bearing surface 22 from the aforementioned buckling damage at each bolt hole, can help effectively maintain fluid-tight sealing at the outer end of the bolt receiving bores 21.

It is to be noted that the present invention can be embodied in various ways other than the above-described embodiment, for example, by providing a plurality of concentric annular projections on the bearing surface 22 within the radial region of the bolt head 11. Alternatively, the annular projection 23 may be configured so as to have a cross section other than a rectangle as shown in FIG. 1, for example, that of a trapezoid, triangle, hemisphere, etc. as required. Although a washer is omitted from the illustration of FIG. 1, the present invention does not preclude the use of a conventional washer in conjunction with the projection 23.

What is claimed is:

1. A reciprocating type refrigerant compressor comprising a cylinder block having formed therethrough a plurality of cylinder bores for receiving therein reciprocally slidable pistons, and housing means made of an aluminum alloy and disposed to close the opposite axial ends of said cylinder block thereby to form part of a refrigerant gas passage in said compressor, said cylinder block and said housing means being fastened together by a plurality of bolts extending through said part of the refrigerant gas passage and respective bores formed in said housing means, each of said bolts having a head supported on a bearing surface formed on said housing means, each said bearing surface being formed by an annular projection concentric with its associated bore in said housing means.

2. A reciprocating type refrigerant compressor according to claim 1, wherein each said annular projection, as formed on said housing means before said cylinder block and said housing means are fastened by said bolts, has a width of substantially 0.5 mm as measured radially with respect to its said associated bore in said housing means.

3. A reciprocating type refrigerant compressor according to claim 2, wherein each said annular projection, as formed before said cylinder block and said housing means are fastened by said bolts, has a height of at least 0.05 mm as measured outwardly from said bearing surface.

4. A reciprocating type refrigerant compressor according to claim 1, wherein said bolts are made of a ferrous metal.

5. A reciprocating type refrigerant compressor according to claim 1, wherein each said annular bearing surface is spaced radially away from its said associated bore.

6. A reciprocating type refrigerant compressor comprising a cylinder block having formed therethrough a plurality of cylinder bores for receiving therein reciprocally slidable pistons, and housing means made of an aluminum alloy and disposed to close the opposite axial ends of said cylinder block thereby to form part of a refrigerant gas passage in said compressor, said cylinder block and said housing means being fastened together by a plurality of bolts made of a ferrous metal and extending through said part of the refrigerant gas passage, and respective bores formed in said housing means for receiving the respective of said bolts, each of said bolts having a head supported on a bearing surface formed on said housing means, each said bearing surface being formed by an annular projection concentric with its associated bore in said housing means, each said annular projection, as formed before said cylinder block and said housing means are fastened by said bolts, having a rectangular shape as seen in cross section through the axial center of said bore in said housing means, with a width of substantially 0.5 mm as measured radially with respect to its said associated bore in said housing means and an axial height of at least 0.05 mm as measured outwardly from said bearing surface.

7. A reciprocating type refrigerant compressor according to claim 6, wherein each said annular bearing surface is spaced radially away from its said associated bore.

* * * * *